(12) United States Patent
Salter et al.

(10) Patent No.: US 11,932,154 B2
(45) Date of Patent: Mar. 19, 2024

(54) VEHICLE HAVING DEPLOYABLE WORK DESK

(71) Applicant: Ford Global Technologies, LLC, Dearborn, MI (US)

(72) Inventors: Stuart C. Salter, White Lake, MI (US); David Brian Glickman, Southfield, MI (US); Dustin Shedlarski, Commerce Township, MI (US); Micah Jones, Pleasant Ridge, MI (US); Ryan Welch, Ottawa Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 86 days.

(21) Appl. No.: 17/872,169

(22) Filed: Jul. 25, 2022

(65) Prior Publication Data

US 2024/0025322 A1 Jan. 25, 2024

(51) Int. Cl.
*B60N 3/00* (2006.01)
*B62D 1/04* (2006.01)
*B62D 25/14* (2006.01)

(52) U.S. Cl.
CPC ............... *B60N 3/001* (2013.01); *B62D 1/04* (2013.01); *B62D 25/14* (2013.01)

(58) Field of Classification Search
CPC .......... B60N 3/001; B60N 3/002; B62D 1/04; B62D 25/14; B60R 2011/0005; B60R 7/06
USPC ................................................. 296/70, 37.12
See application file for complete search history.

(56) References Cited

U.S. PATENT DOCUMENTS

| | | | | |
|---|---|---|---|---|
| 2,845,315 | A * | 7/1958 | McCoy ................... | B60N 3/002 108/45 |
| 5,527,008 | A * | 6/1996 | Schutter ................. | B60N 3/102 248/311.2 |
| 7,407,212 | B1 * | 8/2008 | Kataoka .................... | B60R 5/02 224/483 |
| 9,248,743 | B2 | 2/2016 | Enthaler et al. | |
| 9,862,327 | B2 * | 1/2018 | Huebner ............. | B60R 11/0252 |
| 10,077,003 | B2 * | 9/2018 | Bozio .................... | B60N 2/773 |
| 10,232,802 | B2 * | 3/2019 | Boinais ............... | B60R 13/0262 |
| 10,343,574 | B2 * | 7/2019 | Faruque .................... | B60R 7/04 |
| 10,583,740 | B2 * | 3/2020 | Ory ........................ | B60K 37/02 |
| 10,752,132 | B2 | 8/2020 | Fitzpatrick et al. | |
| 11,155,194 | B2 * | 10/2021 | Hodgson .................. | B60R 7/04 |

(Continued)

FOREIGN PATENT DOCUMENTS

DE 102012009553 A1 12/2012
DE 102019006897 A1 4/2021
(Continued)

*Primary Examiner* — Amy R Weisberg
*Assistant Examiner* — Sara Laghlam
(74) *Attorney, Agent, or Firm* — Vichit Chea; Price Heneveld LLP

(57) ABSTRACT

A vehicle includes a cabin interior, a dashboard located in the cabin interior, and a desk supported on the dashboard and movable between a stowed position on the dashboard and a deployed position extending outward from the dashboard, the desk comprising a plurality of interconnected panels having arms configured to engage a track to bend around at least a portion of the dashboard, and wherein the desk operably moves along the track when moved between the stowed position and the deployed position.

15 Claims, 6 Drawing Sheets

(56) References Cited

U.S. PATENT DOCUMENTS

| | | | | |
|---|---|---|---|---|
| 2006/0011685 A1* | 1/2006 | Tong | ................ | B60N 3/002 |
| | | | | 224/543 |
| 2010/0066113 A1* | 3/2010 | Browne | ............ | B60N 2/793 |
| | | | | 296/24.34 |
| 2018/0314420 A1* | 11/2018 | Bouaziz | ............ | B60K 37/06 |
| 2019/0143869 A1* | 5/2019 | Sequi | ............ | B60R 13/0243 |
| | | | | 296/152 |
| 2019/0241205 A1 | 8/2019 | Toyama et al. | | |

FOREIGN PATENT DOCUMENTS

| | | | | | |
|---|---|---|---|---|---|
| DE | 102014207451 | B4 | 11/2021 | | |
| EP | 1188620 | B1 | 11/2004 | | |
| WO | WO-2015123442 | A1 * | 8/2015 | ............ | B60R 11/00 |
| WO | WO-2021063809 | A1 * | 4/2021 | ............ | B60N 3/002 |

* cited by examiner

VEHICLE HAVING DEPLOYABLE WORK DESK

FIELD OF THE DISCLOSURE

The present disclosure generally relates to passenger vehicles, and more particularly relates to a work table or desk that is deployable within the cabin interior of a vehicle.

BACKGROUND OF THE DISCLOSURE

Motor vehicles are commonly configured with a cabin interior having passenger seating for transporting passengers. In some situations, passengers may want a work space in the vehicle. It would be desirable to provide for a convenient to store and deploy work surface within the cabin compartment.

SUMMARY OF THE DISCLOSURE

According to a first aspect of the present disclosure, a vehicle is provided and includes a cabin interior, and a trim panel component located in the cabin interior. The vehicle also includes a desk supported on the trim panel component and movable between a stowed position on the trim panel component and a deployed position extending outward from the trim panel component, the desk comprising a plurality of interconnected panels having support arms configured to engage a track to wrap around at least a curved portion of the trim panel component, and wherein the desk operably moves along the track when moved between the stowed position and the deployed position.

Embodiments of the first aspect of the present disclosure can include any one or a combination of the following features:
the trim panel component comprises a dashboard;
the dashboard is vehicle-forward of a seat;
the dashboard further comprises a cross beam, wherein the desk bends around at least a portion of the cross beam;
the dashboard comprises a storage bin, wherein the storage bin is covered by the desk in the stowed position and is exposed when the desk is in the deployed position;
a display screen proximate the dashboard, wherein the display screen is stowable in the bin and deployable from the bin when the desk is in the deployed position;
the support arms comprise bearings engaged within the track;
a steering wheel that is configured to be stowed when the desk is in the deployed position;
the desk extends over at least a portion of the steering wheel in the deployed position; and
the desk comprises a first main panel, a second panel and a third panel interconnected in series.

According to a second aspect of the present disclosure, a vehicle is provided and includes a body defining a cabin having an interior, a seat, a dashboard located in the interior of the cabin forward of the seat, and a track located in the dashboard. The vehicle also includes a desk supported on the dashboard in the track and movable between a stowed position on the dashboard and a deployed position extending outward from the dashboard, the desk comprising a plurality of interconnected panels having support arms configured to engage the track to bend around at least a portion of the dashboard, and wherein the desk operably moves along the track when moved between the stowed position and the deployed position.

Embodiments of the second aspect of the present disclosure can include any one or a combination of the following features:
the dashboard further comprises a cross beam, wherein the desk bends around at least a portion of the cross beam;
the dashboard further comprises a storage bin, wherein the storage bin is covered by the desk in the stowed position and is exposed when the desk is in the deployed position;
a display screen stowable in the bin and deployable from the bin when the desk is in the deployed position;
a steering wheel that is configured to be stowed when the desk is in the deployed position, and wherein the desk extends over at least a portion of the steering wheel in the deployed position;
the support arms comprise bearings engaged within the track; and
the desk comprises a first main panel, a second panel and a third panel interconnected in series.

According to a third aspect of the present disclosure, a method of deploying a desk in a vehicle is provided. The method includes the steps of providing a desk located on a dashboard and movable between a stowed position on the dashboard and a deployed position extending outward from the dashboard, the desk comprising a plurality of interconnect panels having arms configured to engage a track to bend around at least a portion of the dashboard, wherein the desk operably moves along the track when moved between the stowed position and the deployed position, and extending the desk from the dashboard such that the support arms move in the track.

Embodiments of the third aspect of the present disclosure can include any one or a combination of the following features:
deploying a display screen from the bin when the desk is in the deployed position; and
stowing a steering wheel when the desk is in the deployed position such that the desk extends over at least a portion of the steering wheel.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
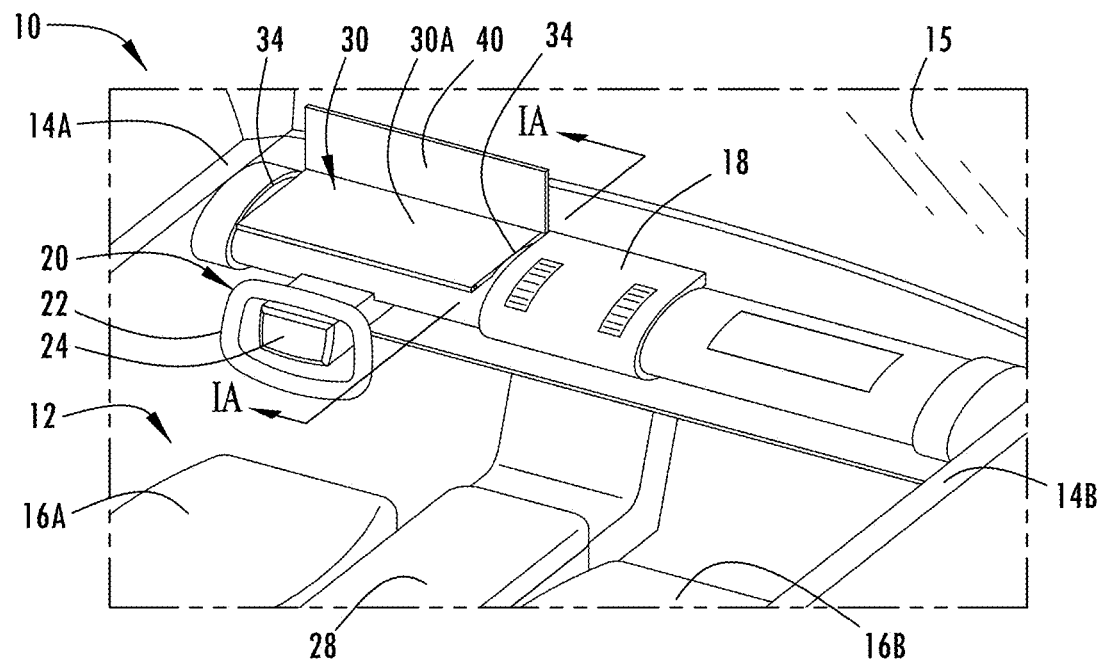
FIG. 1 is a perspective view of a front portion of a cabin interior of a motor vehicle having a first deployable desk in a stowed position, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a deployable work desk. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating and accommodations for transporting one or more passengers including a driver of the vehicle 10. The motor vehicle 10 has a vehicle body that generally defines a cabin interior 12. The cabin interior 12 may contain various features and trim components within the vehicle body. The cabin interior 12 is shown having an arrangement of passenger seats including a first driver seat 16A and a second passenger seat 16B which may be configured as a bench or captain seats, for example, arranged as a front row of seats. The vehicle 10 may also include additional seating such as a second row and further rows of seating as is common for a typical large SUV, van or bus. It should be appreciated that the vehicle 10 may be a motor vehicle, such as a wheeled car, truck, SUV, van or bus, for example, or an airplane, train, boat or other vehicle capable of transporting one or more passengers.

The motor vehicle 10 is illustrated having the driver seat 16A located rearward of a front dashboard 18 that generally defines an interior trim panel component generally located at or proximate to a front portion of the cabin interior 12 which is typically vehicle-rearward of a front windshield 15. The dashboard 18 may include various trim panel components and instruments and may also be referred to as an instrument panel. Located vehicle-forward of the driver seat 16A and rearward of the dashboard 18 is a steering wheel 20 which has a steering rim 22 and a steering column 24 connected thereto. The steering wheel 20 is configured to be engaged by a driver seated in first driver seat 16A and rotated to steer vehicle wheels and hence the vehicle 10. The steering wheel 20 may be a collapsible steering wheel, such as, for example, where the steering rim 22 may fold to a flat position, thereby lowering the top edge of the steering rim 22 when the vehicle 10 is not operated by the driver. In addition, the steering column 24 may collapse in a telescoping manner forward and downward in the vehicle 10, such that the steering wheel 20 may be stowed when the vehicle 10 is not in use, for example.

The vehicle 10 further includes a driver side entry door 14A operatively coupled to the body of the vehicle 10 proximate to a lateral side of driver seat 16A. The vehicle 10 further includes a passenger side entry door 14B operatively coupled to the body of the vehicle 10 proximate to the opposite lateral side proximate to the passenger seat 16B. Doors 14A and 14B may pivot about a front hinge between an open position which allows access via a door opening to the cabin interior 12 and a closed position which closes the door opening.

The vehicle 10 includes the dashboard 18 extending laterally across the front region of the cabin interior 12. The dashboard 18, also referred to as an instrument panel, may contain various electronic instruments, air bags, trim panels and other components. As such, the dashboard 18 is typically located between the steering wheel 20 and a front windshield 15 at the front end of the cabin interior 12. The dashboard 18 has a cross beam 70 extending laterally and an air duct 72 for transferring air to air vents housed therein. The dashboard 18 may include other components such as air bags, vents, etc.

Located in the dashboard 18 is a first deployable desk 30, also referred to as a work desk or table, which is shown in FIG. 1 in a stowed position generally on the top side of the dashboard 18 and operatively coupled to the dashboard 18. The first deployable desk 30 is a rolling desk configured with tambour panels and is movable between the stowed position and a vehicle-rearward extended deployed use position. The first deployable desk 30 is generally positioned forward of the driver seat 16A and steering wheel 20 in the stowed position and is moveable vehicle-rearward to extend towards the driver seat 16A to provide a work surface for use by the driver in the deployed position.

In addition, a display screen 40 is further illustrated located proximate to or in the dashboard 18 at a location generally vehicle-forward of the first deployable desk 30. The display screen 40 may be a fixed display screen or may be a deployable display screen that may be stowed in a compartment in the dashboard 18 when not in use. The display screen 40 may display vehicle related data such as instrument data, engine data, fuel data, navigation information, etc. when the vehicle 10 is in operation, for example. When the vehicle 10 is not operated, the display screen 40 may provide outputs that are communicated or generated with a keyboard or other inputs on the first deployable desk 30, for example.

Figure 1A:
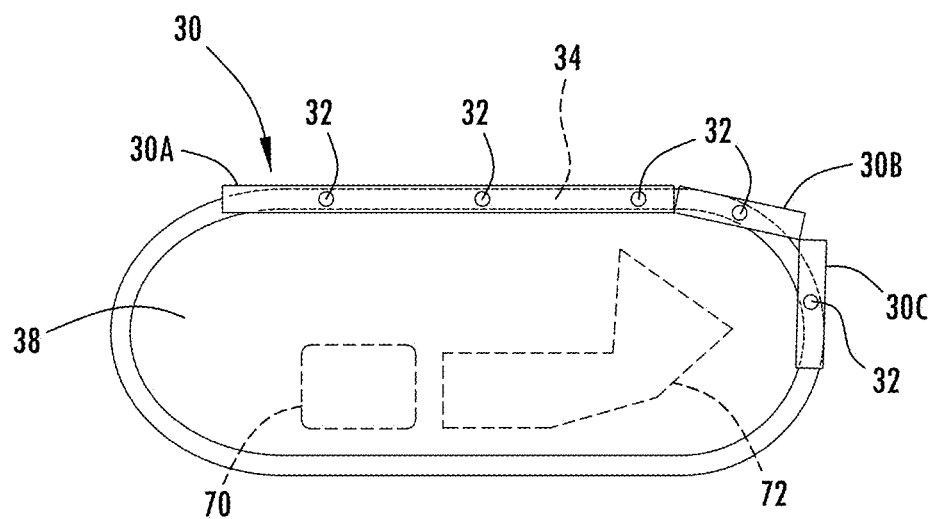
FIG. 1A is a cross-sectional view taken through line IA-IA of FIG. 1 further illustrating the first deployable desk in the stowed position.

The first deployable desk 30 may include a tambour door configuration having a plurality of interconnected tambour door panels linked together, including a first panel 30A operatively coupled to a second panel 30B and a third panel 30C. The first, second and third panels 30A-30C may be connected together in series via pivoting connections in a tambour door arrangement that allow the plurality of panels to pivot relative to one another at least in one direction to allow the second and third panels 30A and 30B to rotate while supported in a track and moving over an arcuate portion of the track in the dashboard 18. As seen in FIGS. 1A and 2A, the first, second and third panels 30A-30C each have lateral extending arms 32 that may have bearings such as rollers or wheels that are engaged in a pair of tracks 34 on opposite lateral sides within the dashboard 18. The rolling movement of the bearings on the support arms 32 in the tracks 34 allows the deployable desk 30 to rotate and roll with low friction on at least a portion of the dashboard 18 between the vehicle-forward stowed position shown in FIGS. 1 and 1A and the vehicle-rearward extended deployed position shown in FIGS. 2 and 2A. It should be appreciated that the first deployable desk 30 may include any of a number of tambour door panels including more than the three panels shown in this example.

Figure 2:
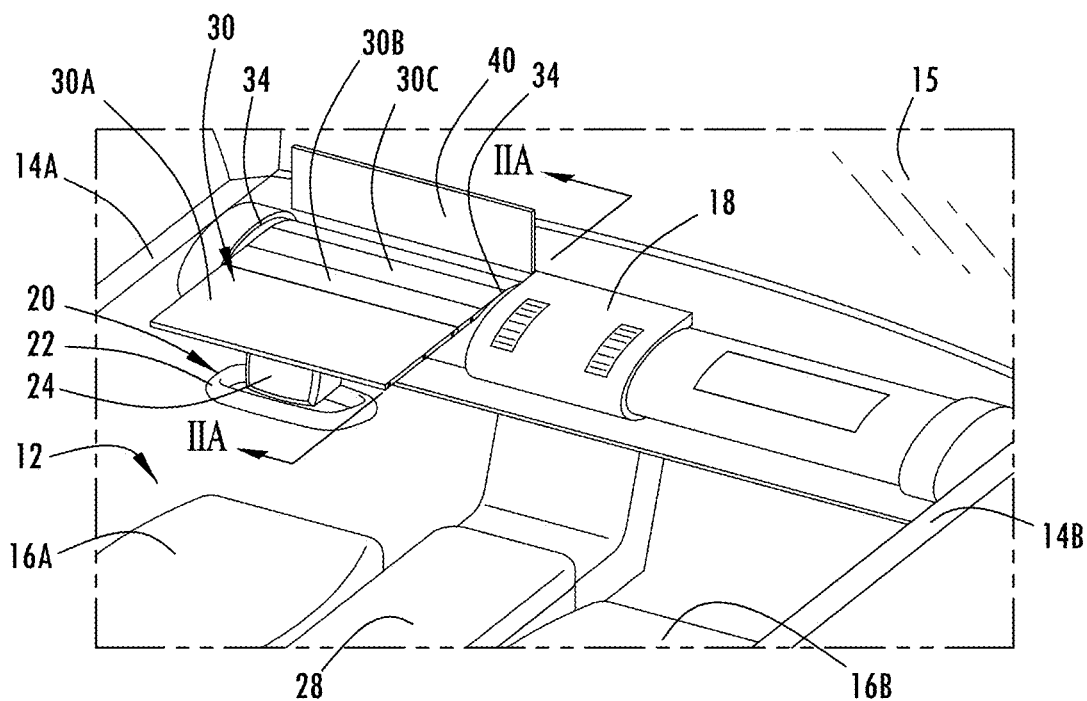
FIG. 2 is a perspective view of the front portion of the cabin interior of the motor vehicle having the first deployable desk in a deployed position.
Figure 2A:
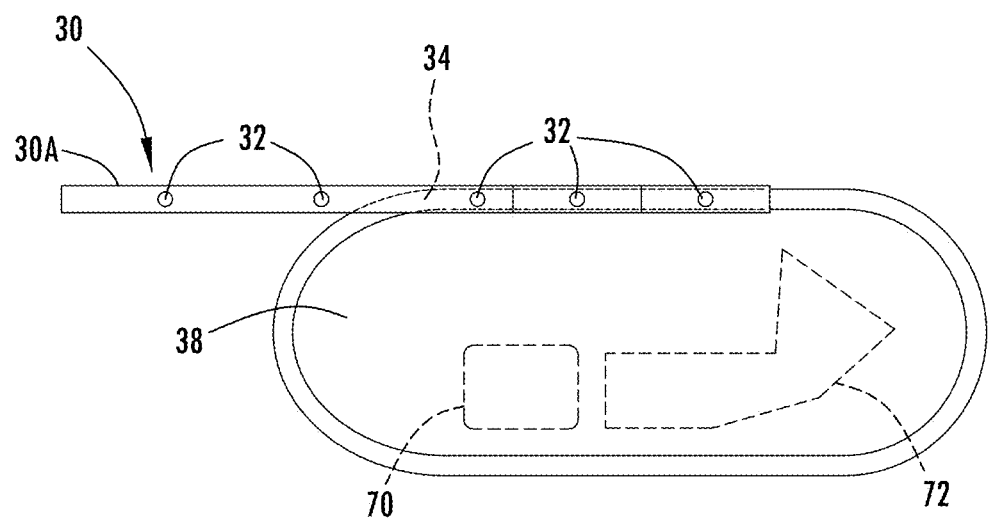
FIG. 2A is a cross-sectional view taken through line II-II of FIG. 2 further illustrating the first deployable desk in the deployed position.

In order to deploy the first deployable desk 30 from the stowed position shown in FIG. 1 vehicle-rearward to the extended deployed position shown in FIG. 2, the steering wheel 20 may be moved to a stowed position as shown in FIG. 2. It should be appreciated that the steering wheel 20 may be moved to the stowed position by any of a number of configurations such as by pivoting the steering wheel 20 down or by collapsing the steering wheel 20 downward and forward into the steering column 24 and rotating the steering wheel rim 22 to a flat position. With the steering wheel 20 in a stowed position, the first deployable desk 30 may extend over a top portion of the steering wheel 20 when the vehicle 10 is not operating and is in park. It should be appreciated that the vehicle 10 should be locked-out in park and not moving when the first deployable desk 30 is deployed. It is anticipated that technology and the regulatory framework may evolve in the future to where using the first deployable desk 30 in a moving vehicle becomes safe and permissible.

With the first deployable desk 30 in the fully deployed position, a stowage compartment 38 provided in the upper portion of the dashboard 18 may be exposed. As such, a user may stow items within the stowage compartment 38 which may be accessed when the first deployable desk 30 is in the fully deployed position. In the stowed position of the first deployable desk 30, the stowage compartment 38 is covered by the deployable desk 30. The stowage compartment 38 may further receive and stow the display screen 40 which, in one example, is a deployable display screen 40, according to one embodiment. In this embodiment, the display screen 40 may pivot about a lateral pivot e.g., hinge, rearward and downward into the stowage compartment 38 for storage and may be pivoted backup to a vertical use position when the first deployable desk 30 is fully deployed.

Figure 3:
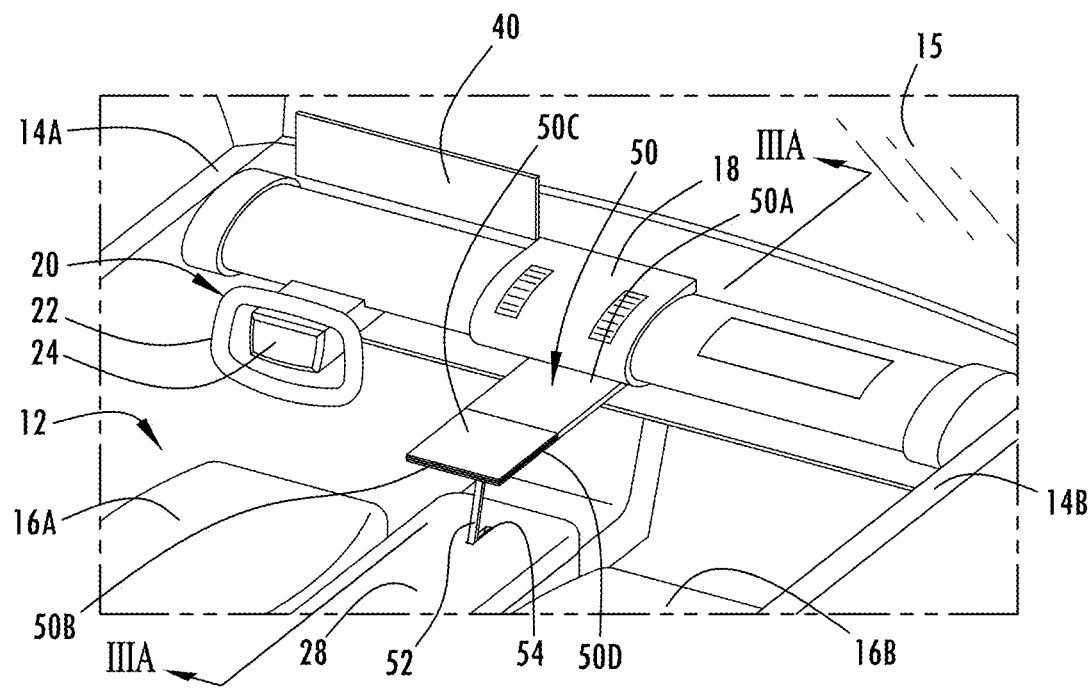
FIG. 3 is a perspective view of a front portion of the cabin interior of the motor vehicle having a second deployable desk in a partially deployed position.
Figure 4:
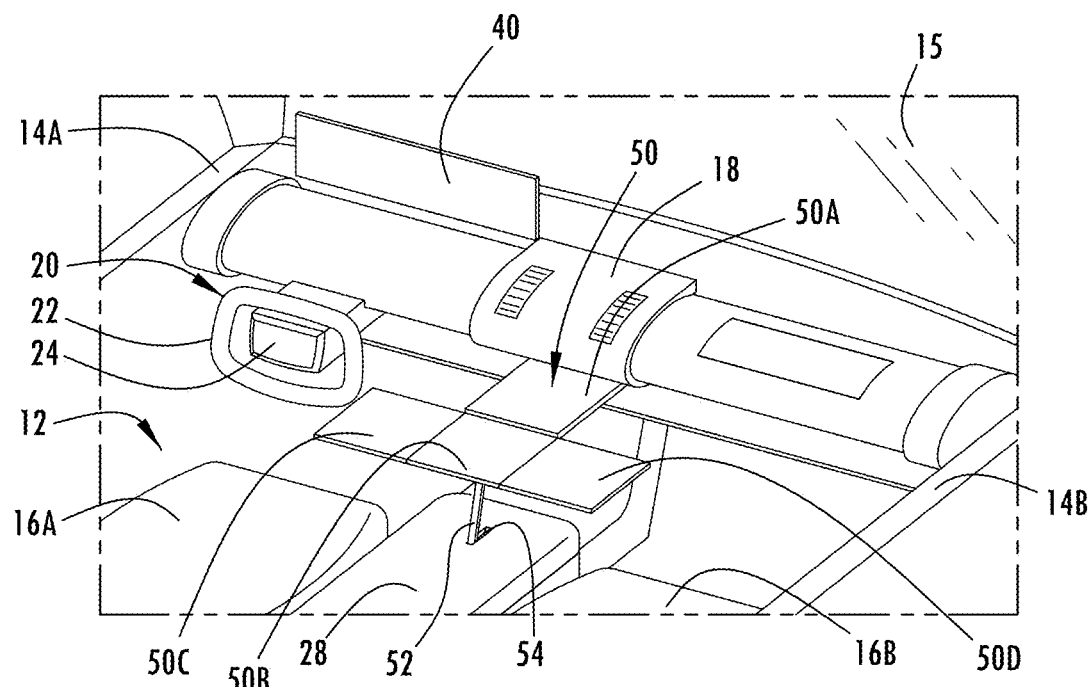
FIG. 4 is a perspective view of the cabin interior shown in FIG. 3 with the second deployable desk in the fully deployed third position.
Figure 3A:
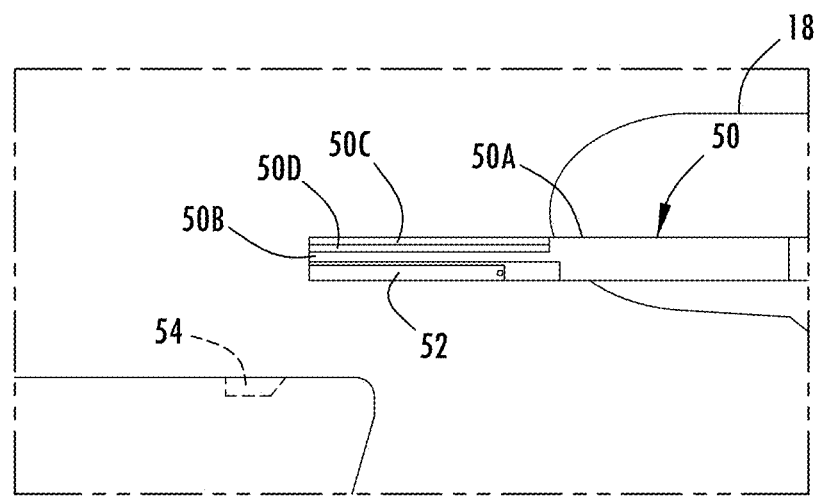
FIG. 3A is a side view of the second deployable desk shown in FIG. 3 with the second deployable desk in a first position.
Figure 3B:
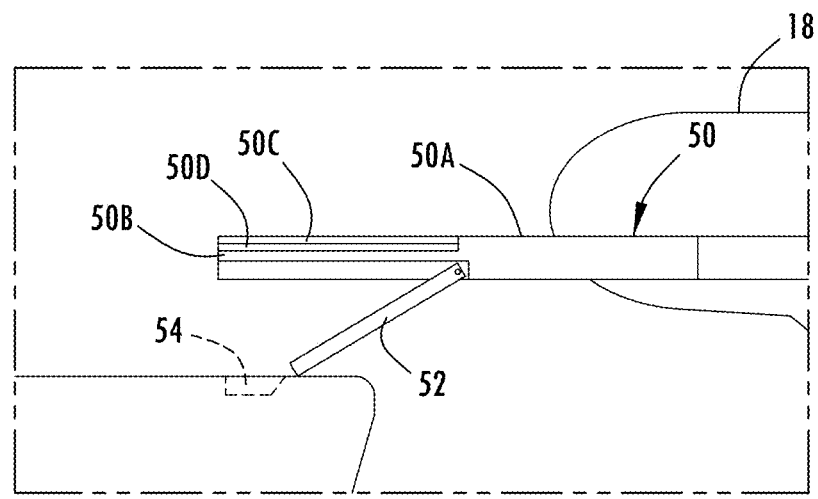
FIG. 3B is a side view of the second deployable desk shown in FIG. 3 with the second deployable desk in a partially deployed second position.
Figure 3C:
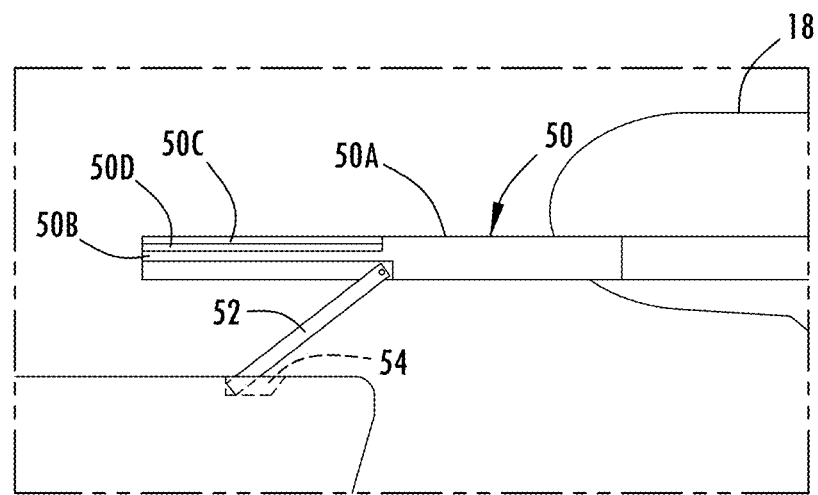
FIG. 3C is a side view of the second deployable desk shown in FIG. 3 with the second deployable desk in a fully deployed third position.

Referring to FIGS. 3-4, a second deployable desk 50 is illustrated generally located in a central location forward of the vehicle center console 28 which is located between the driver seat 16A and passenger seat 16B. The second deployable desk 50 extends vehicle-rearward of the dashboard 18 as shown in FIG. 3 and may be deployed to a further deployed position as shown in FIG. 4. In order to deploy the second deployable desk 50, a plurality of deployable panels are pivotally connected to the main panel 50A such that the panels 50B-50D pivot and fold out to cover an expanded area vehicle-rearward and to the lateral sides. In addition, a support bar 52 provided on the bottom side of the main panel 50A may be stowed on the bottom side and may be pivoted to extend downward to engage and fit within a recess 54 in the upper surface of the center console 28. As such, the support bar 52 provides support for the second deployable desk 50 as the second deployable desk 50 is moved rearward and extended to the fully deployed position as shown in FIGS. 3A-3C.

Figure 5:
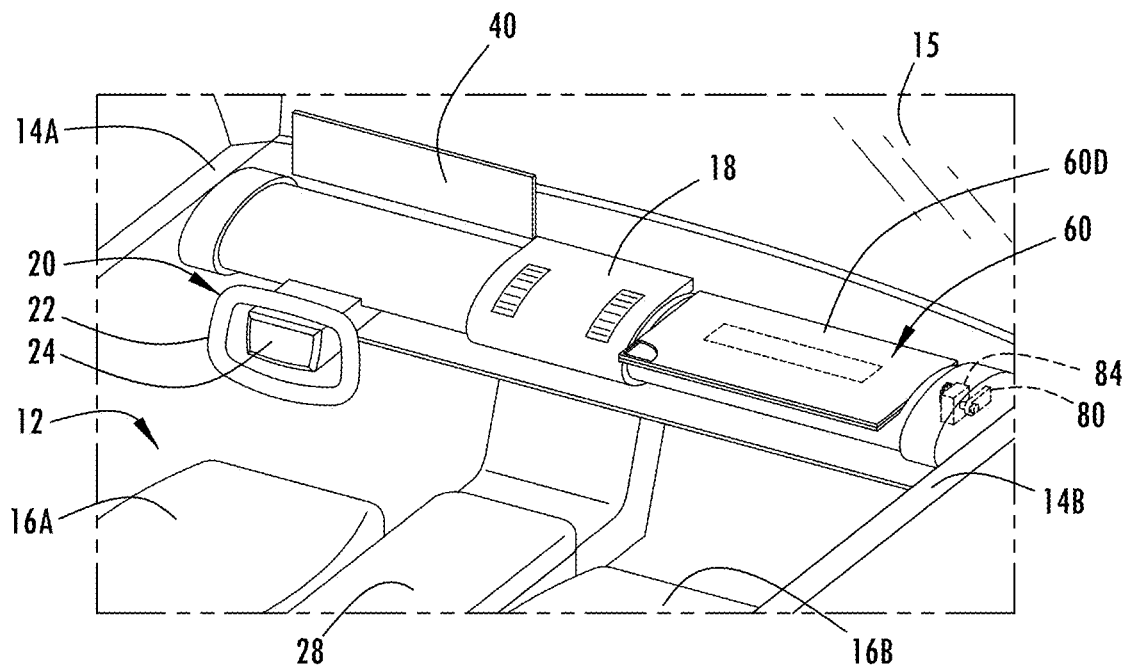
FIG. 5 is a perspective view of a front portion of the cabin interior of the motor vehicle having a third deployable desk in a stowed position.
Figure 6:
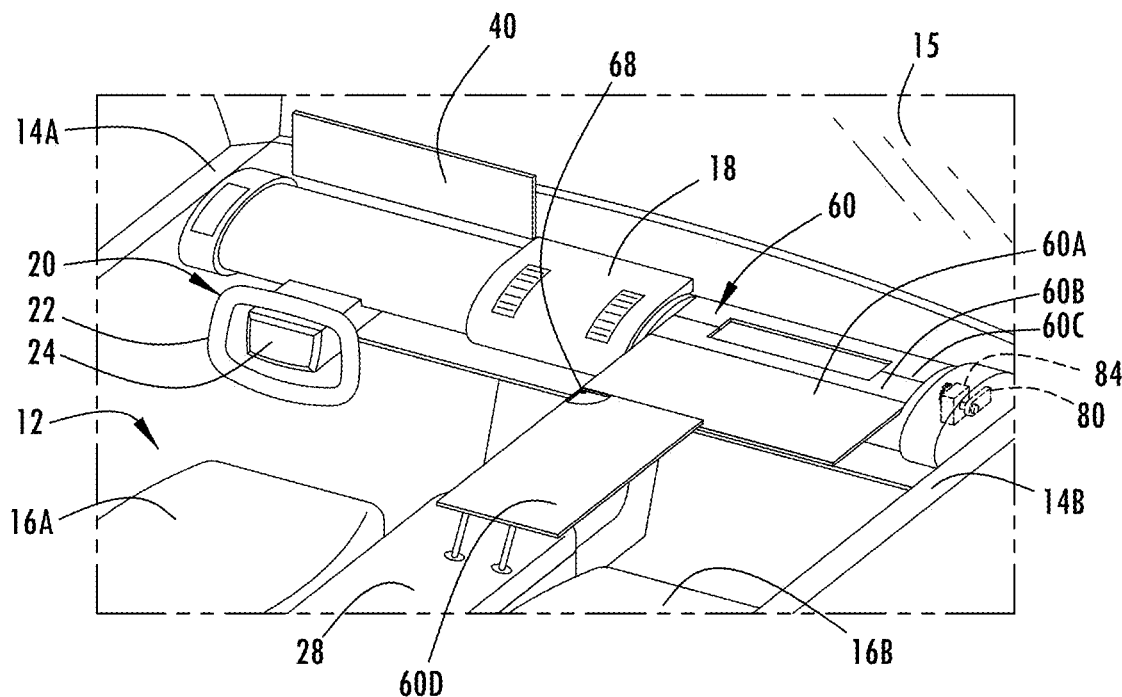
FIG. 6 is a perspective view of the third deployable desk of FIG. 5 illustrated in the deployed position.
Figure 7:
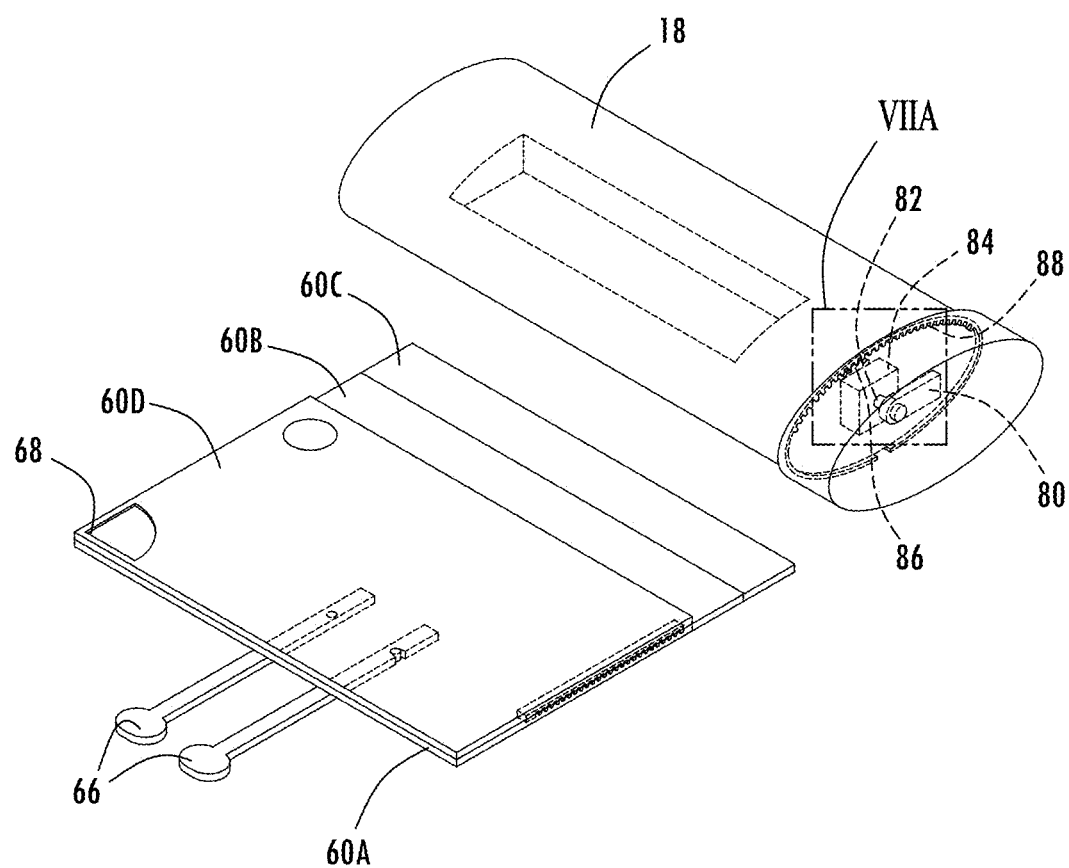
FIG. 7 is an exploded view of the third deployable desk shown in FIG. 5 having an actuator.

Referring to FIGS. 5 and 6, a third deployable desk 60 is illustrated generally forward of the passenger seat 16B and extending vehicle-rearward from the dashboard 18. The third deployable desk 60 may be stowed within the dashboard 18 and deployed from the dashboard 18 similar to the tambour door configuration shown for the first deployable desk 30. As such, the third deployable desk 60 may be stowed within the dashboard 18 as shown in FIG. 5 and may extend out to a fully deployed position as shown in FIG. 6. In doing so, the third deployable desk 60 has a main desk panel 60A interconnected with tambour door panels 60B and 60C that may rotate at the connections. The main desk panel 60A is coupled to a secondary desk panel as shown in FIG. 7. The secondary desk panel 60D may pivot above main panel 60A relative to the main panel 60A via pivot connection 68 to allow for a reconfigurable desk configuration that extend rearward and/or to the lateral side. In addition, a pair of support members 66 may be located on the bottom of the main desk panel 60A and extend outward to support the secondary desk panel 60D and any load applied on top thereof. The support members 66 may be manually attached or may be deployed between a recessed position under the main panel 60A and the extended position.

Figure 7A:
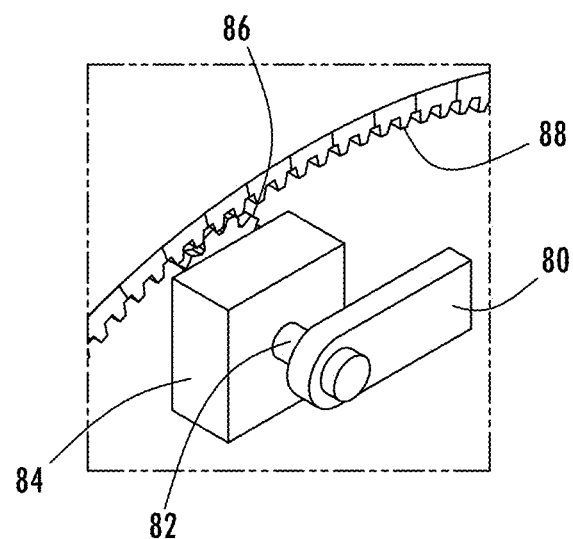
FIG. 7A is an enlarged view of section VIIA in FIG. 7 showing the actuator for actuating the third deployable desk.

As seen in FIGS. 7 and 7A, the third deployable desk 60 may be actuated via an actuator 80 between the stowed and deployed positions. In doing so, an actuator 80, such as a motor, operatively coupled to a gearbox 84 may be employed to drive the third deployable desk 60 between the stowed and extended positions. The actuator 80 drives an output shift 82 which rotates gearbox 84 and a toothed gear 86 that engages teeth 88 on the underside of the third deployable desk 60. It should be appreciated that the first deployable desk 30 may likewise employ an actuator similar to actuator 80 coupled to gearbox 84 to actuate the first deployable desk 30 between the stowed and deployed positions.

Accordingly, the deployable desks 30, 50 and 60 advantageously provide for work surfaces for use in a vehicle 10 that may be stowed and deployed to provide an enhanced work environment within a motor vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
a cabin interior;
a trim panel component located in the cabin interior, wherein the trim panel component comprises a dashboard;
a desk supported on the trim panel component and movable between a stowed position on the trim panel component and a deployed position extending outward from the trim panel component, the desk comprising a plurality of interconnected panels having support arms configured to engage a track to wrap around at least a curved portion of the trim panel component, and wherein the desk operably moves along the track when moved between the stowed position and the deployed position; and
a steering wheel that is configured to be stowed when the desk is in the deployed position, wherein the desk extends over at least a portion of the steering wheel in the deployed position.

2. The vehicle of claim 1, wherein the dashboard is vehicle-forward of a seat.

3. The vehicle of claim 2, wherein the dashboard further comprises a cross beam, wherein the desk bends around at least a portion of the cross beam.

4. The vehicle of claim 3, wherein the dashboard comprises a storage bin, wherein the storage bin is covered by the desk in the stowed position and is exposed when the desk is in the deployed position.

5. The vehicle of claim 4, further comprising a display screen proximate the dashboard, wherein the display screen is stowable in the bin and deployable from the bin when the desk is in the deployed position.

6. The vehicle of claim 1, wherein the support arms comprise bearings engaged within the track.

7. The vehicle of claim 1, wherein the desk comprises a first main panel, a second panel and a third panel interconnected in series.

8. A vehicle comprising:
a body defining a cabin having an interior;
a seat;
a dashboard located in the interior of the cabin forward of the seat;
a track located in the dashboard; and
a desk supported on the dashboard in the track and movable between a stowed position on the dashboard and a deployed position extending outward from the dashboard, the desk comprising a plurality of interconnected panels having support arms configured to engage the track to bend around at least a portion of the dashboard, and wherein the desk operably moves along the track when moved between the stowed position and the deployed position, wherein the dashboard further comprises a cross beam, wherein the desk bends around at least a portion of the cross beam.

9. The vehicle of claim 8, wherein the dashboard further comprises a storage bin, wherein the storage bin is covered by the desk in the stowed position and is exposed when the desk is in the deployed position.

10. The vehicle of claim 8 further comprising a display screen stowable in the bin and deployable from the bin when the desk is in the deployed position.

11. The vehicle of claim 8 further comprising a steering wheel that is configured to be stowed when the desk is in the deployed position, and wherein the desk extends over at least a portion of the steering wheel in the deployed position.

12. The vehicle of claim 8, wherein the support arms comprise bearings engaged within the track.

13. The vehicle of claim 8, wherein the desk comprises a first main panel, a second panel and a third panel interconnected in series.

14. A method of deploying a desk in a vehicle, the method comprising:

- providing a desk located on a dashboard and movable between a stowed position on the dashboard and a deployed position extending outward from the dashboard, the desk comprising a plurality of interconnect panels having arms configured to engage a track to bend around at least a portion of the dashboard, wherein the desk operably moves along the track when moved between the stowed position and the deployed position;
- extending the desk from the dashboard such that the support arms move in the track; and
- stowing a steering wheel when the desk is in the deployed position such that the desk extends over at least a portion of the steering wheel.

15. The method of claim 14 further comprising deploying a display screen from a bin when the desk is in the deployed position.

\* \* \* \* \*